US008885780B2

(12) United States Patent
Luschi et al.

(10) Patent No.: US 8,885,780 B2
(45) Date of Patent: Nov. 11, 2014

(54) ESTIMATING SIGNAL TO INTERFERENCE RATIO IN A WIRELESS COMMUNICATIONS RECEIVER

(75) Inventors: Carlo Luschi, Oxford (GB); Abdelkader Medles, Bristol (GB)

(73) Assignee: Icera Inc., Wilmington, DE (US)

( * ) Notice: Subject to any disclaimer, the term of this patent is extended or adjusted under 35 U.S.C. 154(b) by 780 days.

(21) Appl. No.: 12/808,161

(22) PCT Filed: Dec. 4, 2008

(86) PCT No.: PCT/EP2008/066768
§ 371 (c)(1),
(2), (4) Date: Aug. 4, 2010

(87) PCT Pub. No.: WO2009/077337
PCT Pub. Date: Jun. 25, 2009

(65) Prior Publication Data
US 2010/0284500 A1    Nov. 11, 2010

(30) Foreign Application Priority Data
Dec. 14, 2007  (GB) .................................. 0724423.9

(51) Int. Cl.
*H04B 1/10*     (2006.01)
*H04B 17/00*    (2006.01)

(52) U.S. Cl.
CPC .................................. *H04B 17/006* (2013.01)
USPC ............ 375/346; 375/347; 375/350; 375/316

(58) Field of Classification Search
CPC . H03F 1/3247; H03F 3/24; H03F 2201/3224; H03F 2200/451; H03F 2201/3233; H03F 1/0288; H03F 1/3258; H03F 1/3241; H03F 2200/204; H03F 2200/321; H03F 2200/336; H04B 1/0475; H04L 27/2623; H04L 25/03343; H04L 27/2624

USPC ........................................... 375/260, 340, 346
See application file for complete search history.

(56) References Cited

U.S. PATENT DOCUMENTS

2002/0044591 A1 * 4/2002 Lee et al. ....................... 375/130
2004/0264604 A1 * 12/2004 Malette et al. ................. 375/340
(Continued)

FOREIGN PATENT DOCUMENTS

GB        2410396 A    7/2006
WO    2009077337 A2    6/2009

OTHER PUBLICATIONS

Choi, "Improved Channel Estimation and SIR Measurement in WCDMA Downlink Systems", IEEE Transactions on Vehicular Technology, vol. 54, No. 2, Mar. 2005, pp. 525-537.*

(Continued)

*Primary Examiner* — Kenneth Lam
*Assistant Examiner* — Ross Varndell

(57) ABSTRACT

A method and corresponding system for generating an estimate of at least one of a signal power, a noise power and a signal to interference ratio for signal samples received via first and second wireless channels, the signal samples corresponding to pilot symbols transmitted in respective different structures via the first and second wireless channels. The method comprises: calculating first and second variables, each variable being a sequence of values computed from the received signal samples and the pilot symbols for each respective first and second wireless channel; generating first and second channel estimates from the first and second variables; combining the first and second channel estimates to generate a combined channel estimate; and generating at least one of the signal power, noise power and SIR using the combined channel estimate.

10 Claims, 4 Drawing Sheets

(56) References Cited

U.S. PATENT DOCUMENTS

2005/0036537 A1* 2/2005 Zancho et al. ............... 375/148
2008/0205562 A1* 8/2008 Jonsson et al. ............... 375/347
2010/0284499 A1* 11/2010 Lindoff ......................... 375/346

OTHER PUBLICATIONS

Universal Mobile Telecommunications System (UMTS); Physical channels and mapping of transport channels onto physical channels (FDD) (3GPP TS 25.211 version 6.7.0 Release 6), Dec. 2005, <http://www.etsi.org/deliver/etsi_ts/125200_125299/125211/06.07.00_60/ts_125211v060700p.pdf>.*

Xiaodong Cai et al. "Error Probability Minimizing Pilots for OFDM With M-PSK Modulation Over Rayleigh-Fading Channels" IEEE Transactions on Vehicular Technology, vol. 53, No. 1, Jan. 2004 pp. 146-155.*

A. U. Quddus et al. "SIR Estimation on Common Pilot Channel with the Knowledge of Data to Pilot Power Ratio for Closed Loop Power Control in WCDMA FDD Downlink" 2004.*

Error Probability Minimizing Pilots for OFDM with M-PSK Modulation Over Rayleigh-Fading Channels; Cai, et al.; IEEE Transactions on Vehicular Technology, vol. 53, No. 1, Jan. 2004; 10 pages.

* cited by examiner $N_p = 2:$

| | | |
|---|---|---|
| Antenna 1, $s_1$ | $s(0)$ | $s(1)$ |
| Antenna 2, $s_2$ | $-s^*(1)$ | $s^*(0)$ |

$N_p = 4:$

| | | | | |
|---|---|---|---|---|
| Antenna 1, $s_1$ | $s(1)$ | $s$ | $s(3)$ | |
| Antenna 2, $s_2$ | $-s^*(3)$ | $-s$ | $s^*(1)$ | |

$N_p = 8:$

| | | | | | | | |
|---|---|---|---|---|---|---|---|
| Antenna 1, $s_1$ | $s(1)$ | $s$ | $s(3)$ | $s(3)$ | $s$ | $s(5)$ | $s(7)$ |
| Antenna 2, $s_2$ | $-s^*(3)$ | $-s$ | $s^*(1)$ | $-s^*(3)$ | $s$ | $-s^*(3)$ | $s^*(1)$ |

Figure 2

PRIOR ART

ESTIMATING SIGNAL TO INTERFERENCE RATIO IN A WIRELESS COMMUNICATIONS RECEIVER

CROSS-REFERENCE TO RELATED APPLICATIONS

This application is the National Stage of, and therefore claims the benefit of International Application No. PCT/EP2008/066768 filed on Dec. 4, 2008, entitled "ESTIMATING SIGNAL TO INTERFERENCE RATIO IN A WIRELESS COMMUNICATIONS RECEIVER," which was published in English under International Publication Number WO 2009/077337 on Jun. 25, 2009, and has priority based on GB 0724423.9 filed on Dec. 14, 2007. Each of the above applications is commonly assigned with this National Stage application and is incorporated herein by reference in their entirety.

TECHNICAL FIELD

The present invention relates to estimation of signal to interference ratio in a wireless communications receiver. The invention is particularly but not exclusively concerned with the situation where there are multiple transmit antennas.

BACKGROUND

The transmission of radio signals carrying data in modern wireless communications can be realized based on the number of different communication systems, often specified by a standard. Mobile radio receiver devices include analog radio frequency (RF)/intermediate frequency (IF) stages which are arranged to receive and transmit wireless signals via one or more antennas. The output of the RF/IF stages is typically converted to baseband, wherein an analog to digital converter (ADC) converts incoming analog signals to digital samples, which are then processed for signal detection and decoding of the data in the form of reliability values. The ADC may alternatively operate directly at IF, in which case the conversion to baseband is performed in the digital domain.

An important factor in processing the digital samples is given by the knowledge of the signal to interference ratio (SIR) on the transmission channel or channels which have been used for the signal. One way of estimating the SIR is to use the CPICH (common pilot channel) to derive a channel estimate, and then use the estimated channel to evaluate the SIR. In that case it is necessary to correct for possible power differences in the transmission of the common pilot channel and the data channel.

In a 3GPP wideband code division multiple access (WCDMA) receiver, the downlink dedicated physical channel (DPCH) carries pilot symbols that can be used to evaluate the signal-to-interference ratio (SIR) of the DPCH data channel (DPDCH) at the output of the signal detector. Signal detection can be based for instance on rake processing (per finger de-scrambling and de-spreading followed by fingers combining) or chip-level equalization (equalizer filtering followed by de-scrambling and de-spreading). Compared to the above-described alternative of using CPICH channel estimate to evaluate the SIR and correcting for channel power differences, the use of the dedicated pilots at the detector output has the advantage of simplicity and allows to take in account any imperfections introduced by a specific implementation of signal detection of the DPCH data.

In the case of a single transmit antenna, both the pilots and the data are coded in the same way at the transmitter. This allows the use of the DPCH pilots to estimate the SIR of DPDCH symbols without any special processing on the pilot symbols. However, in the case of close loop transmit diversity (CLTD) the pilot and the data symbols are coded differently, as described in 3GPP TS 25.211, "Technical Specification Group Radio Access Network, Physical Channels and Mapping of Transport Channels onto Physical Channels (FDD)", December 2005, Section 5.3.

FIG. 1 is a schematic block diagram of the transmitter processing, illustrating the use of multiple transmit antennas, and the transmitter CLTD processing for the DPCH channel.

Two transmit antennas A1, A2 are shown in FIG. 1, though it is possible for there to be more than two transmit antennas. The antennas transmit wireless signals corresponding to first and second pilot sequences labeled 'DPCH Pilots 1' and 'DPCH Pilots 2', and the data sequence labeled 'DPCH Data'. Symbols from each of the sequences are applied respectively to the multipliers M1, M3 and M2, which multiply the symbols by the scrambling/spreading code in a manner which is known per se. The resulting chip sequences obtained from the first pilot sequence 'DPCH Pilots 1' and the data sequence 'DPCH Data' are supplied to a first slot multiplexer SM1, while the chip sequences obtained from the second pilot sequence 'DPCH Pilots 2' and the data sequence 'DPCH Data' are supplied to a second slot multiplexer SM2. These allow the data and pilot information to be carried according to the specified slot format in a DPCH slot, in a manner known per se. The outputs of the slot multiplexers are weighted using weighting factors $w_1$, $w_2$ respectively, and then supplied to the transmitter antennas A1, A2 for transmission.

Details on the specific pilot symbols structure used on the DPCH channel are shown in FIG. 2, for the three different pilot lengths $N_p$=2, 4 and 8. These pilot sequences are orthogonal across the transmit antennas. The pilot symbol s is constant, $s=(1+j)/\sqrt{2}$. The other pilot symbols in FIG. 2 are QPSK symbols that change from one slot to another as specified in Table 12 and Table 15 of 3GPP TS 25.211, "Technical Specification Group Radio Access Network; Physical Channels and Mapping of Transport Channels onto Physical Channels (FDD)", December 2005, Section 5.3.

The pilot sequence shown in FIG. 2 is composed of $N_p/2$ orthogonal symbol pairs:

For $N_p$=2, the orthogonal pair is derived from the sequence itself.

For $N_p$=4, the 2 orthogonal pairs correspond to time indices (0,2) and (1,3).

For $N_p$=8, the 4 orthogonal pairs correspond to time indices (0,2), (1,3), (4,6) and (5,7).

FIG. 3 is a schematic block diagram of the receiver signal processing. Antenna A3 denotes the antenna for receiving the wireless signal which is processed by the receiver front-end, converted to baseband, and supplied to the signal detection block 2. At the detector output, the dedicated physical channel is supplied to a slot demultiplexer 4 which demultiplexes the pilot symbols separately from the data symbols. The signal samples corresponding to the pilot symbols are supplied to an SIR estimation block 6, while the samples corresponding to the data symbols are supplied to an LLR calculation/demapping block 8 which generates bit reliability values. In order to do this, the LLR calculation/demapping block 8 uses the estimated signal power and noise power values from the SIR estimation block 6. The signal detection could be based on rake processing or equalizer processing, and the antenna weights $w_1$, $w_2$ are handled herein in a manner known per se.

At the output of the DPCH slot demultiplexer 4 of FIG. 3, the DPCH pilot signal for the pilot index k (k=0, ..., $N_p-1$, with $N_p$ number of pilot symbols) can be written as $$y_p(k)=h_1 s_1(k)+h_2 s_2(k)+n(k), \quad \text{Equation 1}$$

where $s_1(k)$, $E\{|s_1(k)|^2\}=1$ (respectively $s_2(k)$, $E\{|s_2(k)|^2\}=1$) denotes the pilot symbol on antenna 1 (respectively antenna 2), $h_1$ (respectively $h_2$) represents the channel gain from antenna 1 (respectively antenna 2) and $n(k)$ is an additive noise process that models the noise plus interference at the output of the signal detection stage. In equation 1, the CLTD antenna weights $w_1$, $w_2$ are included in the channel gains $h_1$, $h_2$.

The DPDCH signal at the output of the DPCH slot demultiplexer of FIG. 3 is written as $$y_d(k)=(h_1+h_2) \cdot d(k)+n(k), \quad \text{Equation 2}$$

where $d(k)$ is the transmitted data stream, $E\{|d(k)|^2\}=1$. In contrast to the pilot symbols, the data symbols experience the composite channel of antenna 1 and 2, $h=h_1+h_2$.

The SIR on the DPDCH signal is therefore $$SIR = \frac{P_S}{P_N} = \frac{(1/\gamma)|h_1+h_2|^2}{P_N}, \quad \text{Equation 3}$$

where $\gamma$ is the power ratio between the pilot and the data transmitted on the DPCH. In the 3GPP WCDMA standard, $\gamma$ is signaled by the Node-B (by the network) to the UE receiver over a logical control channel.

For the decoding of the data, both the numerator and denominator of the SIR (3) (the signal power $P_S$ and the noise power $P_N$) are required, and have to be estimated. Since the DPCH pilot signal has a different structure with respect to the data and is composed of two pilot streams, one per antenna, SIR estimation requires special processing of the pilot signal.

It has been observed that the orthogonal DPCH pilot leads to errors in the SIR measurement when traditional SIR estimation algorithms are used, and therefore it has been suggested to use the data symbols for SIR estimation. A known algorithm described in A. U. Priantoro, M. Okada and H. Yamamoto, "Comparison of SIR-based Closed Loop TPC in W-CDMA Considering Closed Loop Transmit Diversity Mode 1", IEEE Region 10 Conference, TENCON 2004, vol. 2, November 2004, pp. 525-528, and in A. U. Priantoro, M. F. Mohamad, M. Okada and H. Yamamoto, "Data-aided SIR measurement for closed loop fast TPC suitable for W-CDMA with closed loop transmit diversity," IEEE International Conference on Personal Wireless Communications, ICPWC 2005, January 2005, pp. 169-173, performs tentative decisions on the data symbol in order to be able to generate estimates of the signal and noise power. This algorithm requires additional complexity due to the need to perform tentative decisions, and suffers from performance degradation under low SIR conditions, where the tentative decisions are less reliable.

It is an aim of the present invention to allow the pilot symbols to be used for SIR estimation, according to a procedure that allows to efficiently compute an estimate of the signal and noise power and of the SIR.

SUMMARY

According to an aspect of the present invention there is provided a method of generating an estimate of at least one of a signal power, a noise power and a signal to interference ratio for signal samples received via first and second wireless channels, the signal samples corresponding to pilot symbols transmitted in respective different structures via the first and second wireless channels. The method comprises: calculating first and second variables, each variable being a sequence of values computed from the received signal samples and the pilot symbols for each respective first and second wireless channel; generating first and second channel estimates from the first and second variables; combining the first and second channel estimates to generate a combined channel estimate; and generating at least one of the signal power, noise power and SIR using the combined channel estimate.

It will be recognized however that the method can usefully be applied to generate the signal power and/or noise power for situations where these are used in signal processing other than determining the SIR.

According to a further aspect of the present invention there is provided a wireless receiver for use in a wireless communications system. The receiver comprises: an antenna for receiving a sequence of signal samples via first and second wireless channels; means for storing pilot symbol structures which have been transmitted over the first and second wireless channels, each pilot symbol structure comprising a plurality $N_p$ of pilot symbols; and means for generating an estimate of at least one of a signal power, a noise power and a signal to interference ratio for the signal samples received via the first and second wireless channels. The means comprises a processor programmed to implement the following steps: calculating first and second variables, each variable being a sequence of values computed from the received signal samples and the pilot symbols for each respective first and second wireless channel; generating first and second channel estimates from the first and second variables; combining the first and second channel estimates to generate a combined channel estimate; and generating an estimate of at least one of the signal power, noise power and SIR using the combined channel estimate.

According to a further aspect of the present invention there is provided a wireless communications system. The wireless communications system comprises: a transmitter arranged to transmit via first and second antennas first and second wireless signals, the first wireless signal comprising a first pilot symbol structure and the second wireless signal comprising a second pilot symbol structure; and a wireless receiver as defined hereinabove.

BRIEF DESCRIPTION OF THE DRAWINGS

For a better understanding of the present invention and to show how the same may be carried into effect, reference will now be made by way of example to FIG. 4 of the accompanying drawings, in which:

FIG. 2 is a table showing the pilot structure for different pilot lengths;

DETAILED DESCRIPTION

Figure 1:
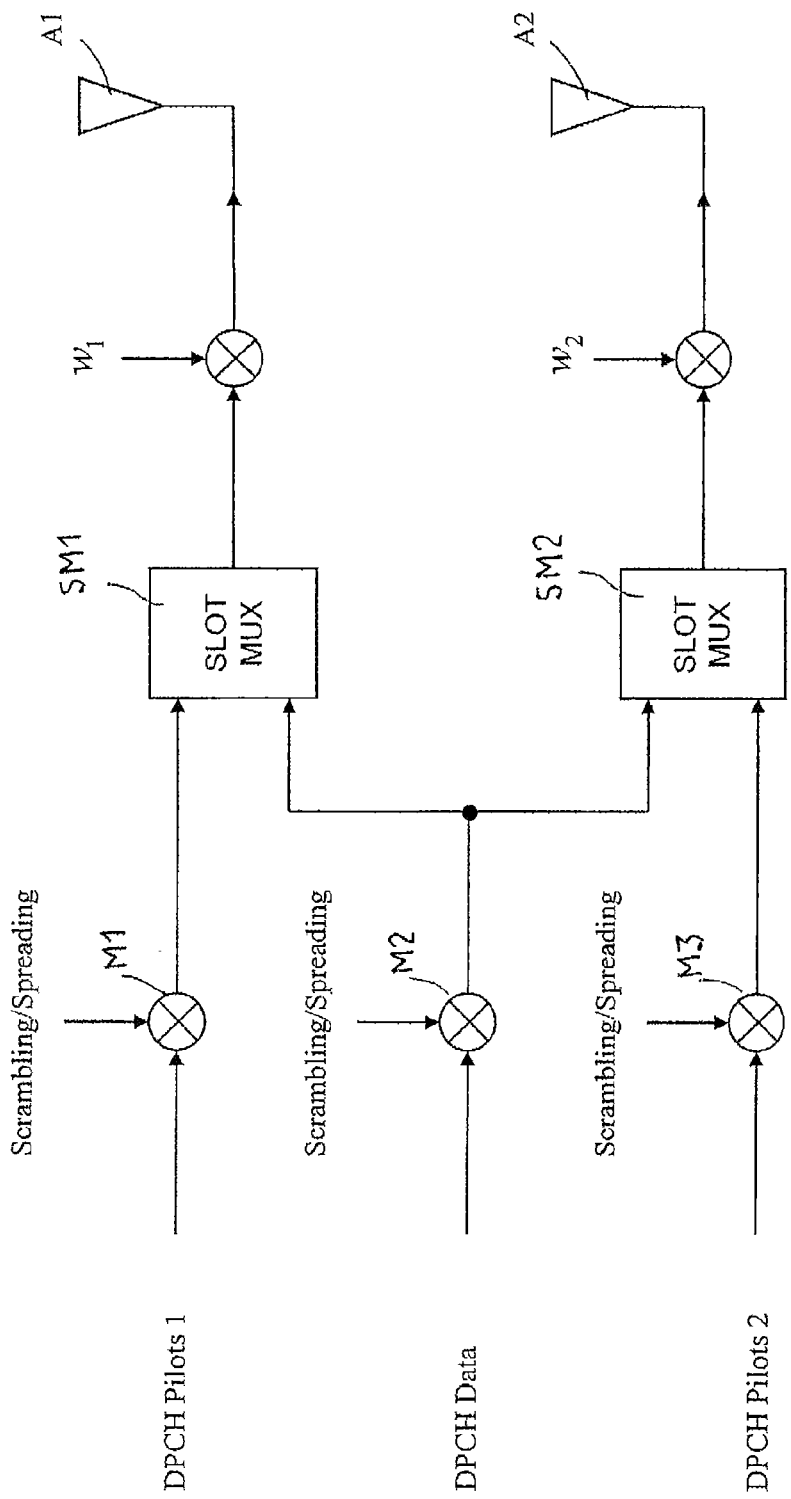
FIG. 1 is a schematic block diagram of the basic transmitter processing.

The method and system discussed below as one embodiment of the present invention implements estimation of signal to interference ratio based on the dedicated downlink DPCH pilot symbols in a way which exploits the structure of these pilots, cancels the interference between the pilot signals coming from the two antennas, and efficiently calculates the signal and noise power and/or the SIR. In the embodiment discussed below, the receiver processing is discussed in the context of the transmitter arrangement as described in FIG. 1 above. The algorithm which is used in the method has a reduced numerical complexity required for estimation of the SIR, with respect to other solutions of the prior art.

Figure 3:
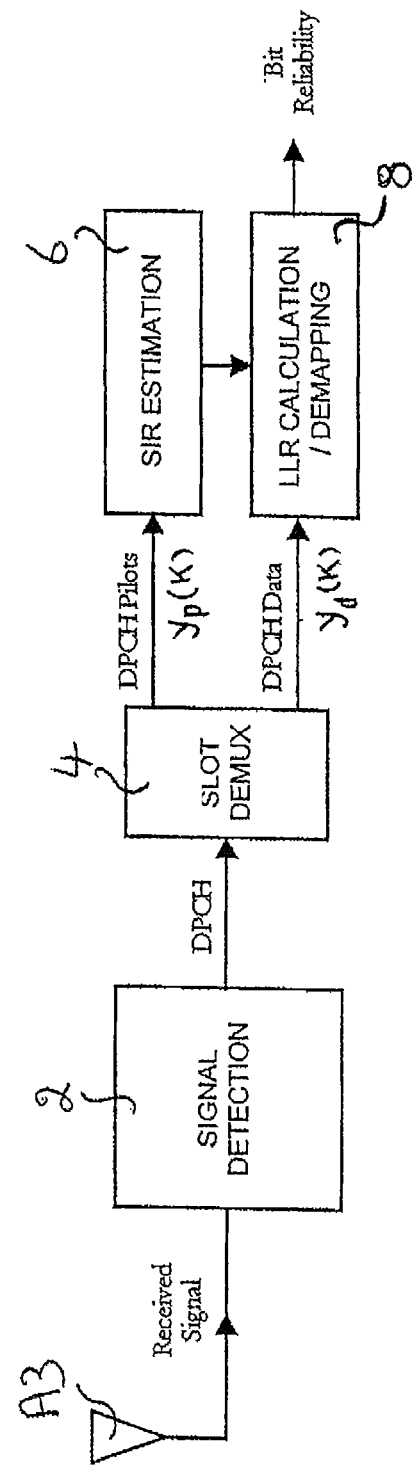
FIG. 3 is a schematic block diagram of the basic DPCH channel receiver processing.
Figure 4:
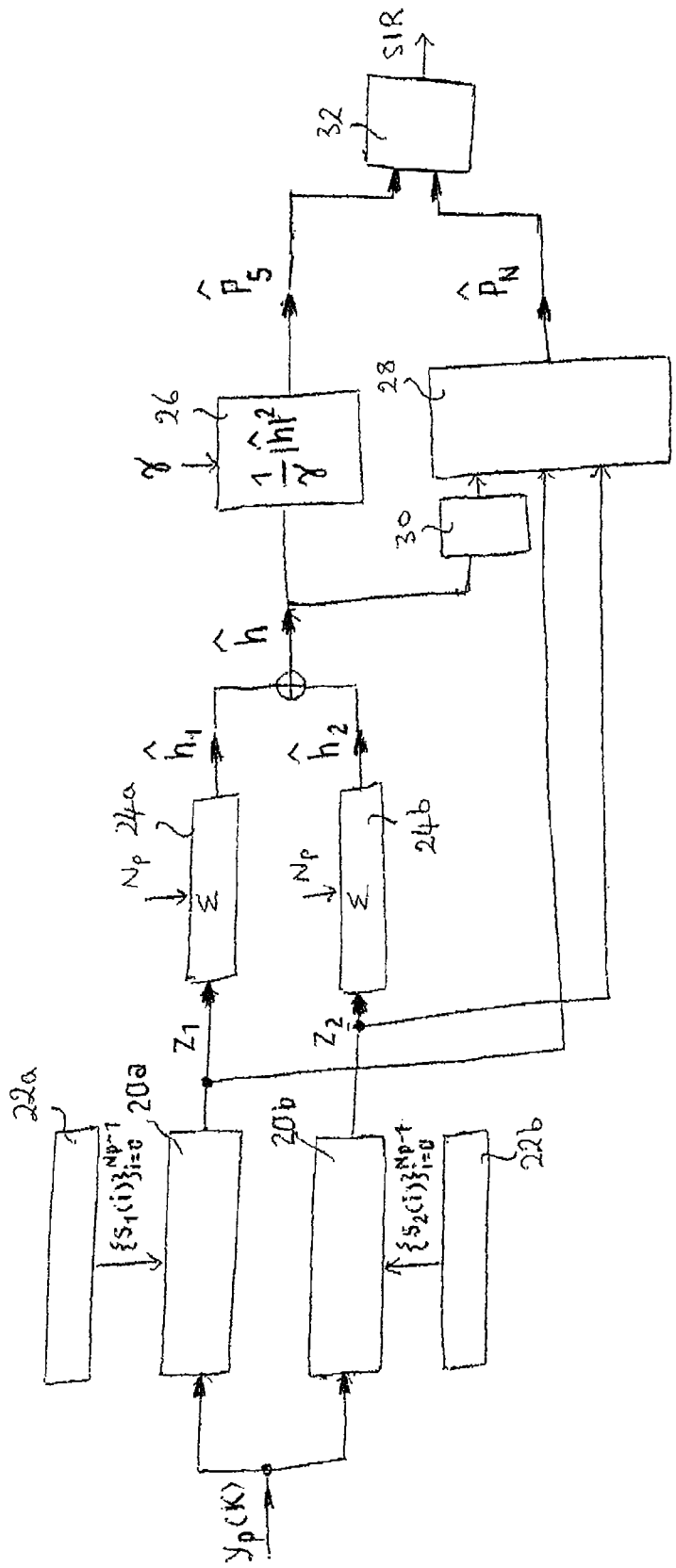
FIG. 4 is a schematic block diagram illustrating an embodiment of the present invention.

FIG. 4 is a schematic block diagram illustrating functional components for implementing a method according to one embodiment of the present invention. It will readily be appreciated from the following description that the functional components can be implemented as a suitably programmed processor, or in particular as code blocks ready for execution by a suitable programmed processor. FIG. 4 can be considered as a representation of a novel implementation of the SIR estimation block 6 in FIG. 3.

The block diagram in FIG. 4 includes first and second variable calculation units 20a, 20b. The units 20a, 20b receive a sequence of samples corresponding to the pilot symbols on the signal labeled 'DPCH Pilots' in FIG. 3, output from the slot demultiplexer 4 to the SIR estimation block 6 of FIG. 3.

The variable calculation units 20a, 20b of FIG. 4 each receive from the memory blocks 22a, 22b a set of known pilot symbols used on the respective transmit antenna. The memory blocks can be a common memory and are shown separately for diagrammatic purposes only. The symbols received by the variable calculation units depend on the length of the pilot structure, as illustrated in FIG. 2. For $N_p$=2, only the symbols s(0), s(1) are received. For $N_p$=4, the received symbols are s(0), ..., s(3), and for $N_p$=8 the received symbols are s(0), ..., s(7).

In the case where $N_p$=4, $s_1(0)$=s and $s_1(2)$=s for antenna 1, $s_2(0)$=s and $s_2(2)$=−s for antenna 2, and similarly for $N_p$=8.

The variables $z_1$, $z_2$ calculated by the respective calculation units 20a, 20b are supplied respectively to summation units 24a, 24b which generate the channel gain estimates $\hat{h}_1$, $\hat{h}_2$. When summed, these channel gain estimates generate the combined channel gain estimate $\hat{h}$. The combined channel gain estimate $\hat{h}$ is supplied to a unit 26 for estimating the signal power. The combined channel gain estimate is also supplied to a unit 28 for estimating the noise power. If necessary, the combined channel gain estimate $\hat{h}$ can be supplied via a filter 30.

The estimates of signal power $\hat{P}_S$ and noise power $\hat{P}_N$ are supplied to a ratio unit 32 which generates the estimated SIR.

More in detail, in the embodiment illustrated in FIG. 4 the estimation of the signal and noise power and the estimation of the SIR are performed according to the following procedure.

1. The intermediate variables $z_1(k), z_2(k), k=1, \ldots, N_p/2$ are calculated in the blocks 20a, 20b. Each signal $z_i(k), i=1, 2$, is obtained from the received pilot signal $y_p(k)$ demodulated by the k-th orthogonal pilot pair transmitted on antenna i. The exact calculation for each pilot length is given by the following equations:

$N_p$=2:

Antenna 1, $z_1$ $z_1(0)=y_p(0)\cdot s^*_1(0)+y_p(1)\cdot s^*_1(1)$

Antenna 2, $z_2$ $z_2(0)=y_p(0)\cdot s^*_2(0)+y_p(1)\cdot s^*_2(1)$ $N_p$=4:

Antenna 1, $z_1$ $z_1(0)=y_p(0)\cdot s^*_1(0)+y_p(2)\cdot s^*_1(2), z_1(1)=y_p(1)\cdot s^*_1(1)+y_p(3)\cdot s^*_1(3)$ Antenna 2, $z_2$ $z_2(0)=y_p(0)\cdot s^*_1(0)+y_p(2)\cdot s^*_2(2), z_2(1)=y_p(1)\cdot s^*_2(1)+y_p(3)\cdot s^*_2(3)$ $N_p$=8:

Antenna 1, $z_1$ $z_1(0)=y_p(0)\cdot s^*_1(0)+y_p(2)\cdot s^*_1(2), z_1(1)=y_p(1)\cdot s^*_1(1)+y_p(3)\cdot s^*_1(3)$ $z_1(2)=y_p(4)\cdot s^*_1(4)+y_p(6)\cdot s^*_1(6), z_1(3)=y_p(5)\cdot s^*_1(5)+y_p(7)\cdot s^*_1(7)$ Antenna 2, $z_2$ $z_2(0)=y_p(0)\cdot s^*_2(0)+y_p(2)\cdot s^*_2(2), z_2(1)=y_p(1)\cdot s^*_2(1)+y_p(3)\cdot s^*_2(3)$ $z_2(2)=y_p(4)\cdot s^*_2(4)+y_p(6)\cdot s^*_2(6), z_2(3)=y_p(5)\cdot s^*_2(5)+y_p(7)\cdot s^*_2(7)$ where asterisk denotes complex conjugate.

2. In the blocks 24a, 24b the channel gain from each antenna $\hat{h}_1$, $\hat{h}_2$ is estimated and subsequently summed, to provide the combined channel gain $\hat{h}$ $$\hat{h}_1 = \frac{1}{N_p} \sum_{k=0}^{N_p/2-1} z_1(k),$$

$$\hat{h}_2 = \frac{1}{N_p} \sum_{k=0}^{N_p/2-1} z_2(k) \quad \hat{h} = \hat{h}_1 + \hat{h}_2.$$

3. The DPDCH signal power is estimated in block 26

$$\hat{P}_S = \frac{1}{\gamma}|\hat{h}|^2.$$

4. If $N_p$=2, the pilot length is not enough to estimate the noise power. In this case, the time correlation can be exploited by filtering the combined channel gain in the filter 30

$$\hat{h}'(n)=\lambda\hat{h}(n)+(1-\lambda)\hat{h}'(n-1),$$

where n is the slot index, $\hat{h}'(n-1)$ is the filtered combined channel gain from the previous slot and $0<\lambda<1$ is a filtering parameter. As one example the parameter $\lambda$ can assume the value $\lambda$=⅛. A reasonable range of $\lambda$ is between a small positive number, like for instance 1/64, and ½.

5. The DPDCH noise power is estimated in block 28 by $$N_p = 2: \quad \hat{P}_N \frac{1}{2}|z_1(0)+z_2(0)-2\hat{h}'|^2$$

$$N_p = 4, 8: \quad \hat{P}_N = \frac{1}{2(N_p-2)}\sum_{i=1}^{2}\sum_{k=0}^{N_p/2-1}|z_i(k)-2\hat{h}_i|^2.$$

6. The SIR is estimated in ratio block 32 as $$SIR = \frac{\hat{P}_S}{\hat{P}_N}.$$

The SIR estimation can be improved by filtering the signal and noise power $$\hat{P}'_S(n)=\alpha\hat{P}_S(n)+(1-\alpha)\hat{P}'_S(n-1)$$

$$\hat{P}'_N=\beta\hat{P}_N(n)+(1-\beta)\hat{P}'_N(n-1),$$

where n is the slot index, $\hat{P}'_S(n-1)$ and $\hat{P}'_N(n-1)$ are the filtered signal and noise power estimates from the previous slot and $0<\alpha,\beta<1$ are filtering parameters. As an example, $\alpha=\beta=\frac{1}{8}$. A reasonable range for $\alpha$, $\beta$ is from a small positive number, like for instance $\frac{1}{64}$, to $\frac{1}{2}$.

To evaluate the effectiveness of the solution, detailed simulations have been carried out. The simulations were performed for a WCDMA transmission with DPCH slot format 11 (spreading factor SF=128) with power ratio between the DPCH data and pilot fields $\gamma=1$, AWGN propagation conditions and a single downlink cell with cell geometry of 5 dB (cell geometry being defined as the ratio between the total downlink power received from the wanted cell and the total power received by other cells). The DPCH was transmitted from two transmit antennas based on the closed loop mode 1 transmit diversity scheme, and mean and standard deviation of the 3GPP estimated SIR were evaluated for different values of DPCH transmitted power. Table 1 contains the results obtained for the estimated SIR compared to the case of genie knowledge of the true SIR ('Genie SIR'). In the table, $E_c$ denotes the average DPCH energy per chip transmitted in the downlink, and $I_{or}$ indicates the total transmit power spectral density from the Node B.

TABLE 1

Performance of DPDCH SIR estimation using the proposed method.

| DPCH Ec/Ior (dB) | −25 | −20 | −15 | −10 |
|---|---|---|---|---|
| Genie SIR (dB) | 3.4 | 8.4 | 13.4 | 18.4 |
| Mean Estimated SIR (dB) | 3.78 | 8.55 | 13.5 | 18.49 |
| Standard Deviation (dB) | 0.99 | 0.77 | 0.7 | 0.69 |

The collected performance results shows that the proposed method allows to estimate accurately the SIR with a standard deviation of less than 1 dB.

What is claimed is:

1. A method of generating an estimate of a signal power, a noise power and a signal to interference ratio (SIR) for signal samples received via first and second wireless channels via a first and second antenna, said signal samples corresponding to pilot symbols transmitted in via said first and second wireless channels wherein a length of the pilot symbols is $N_p$ and $N_p \geq 2$, the method comprising:
calculating first and second variables corresponding to the first and second antennas, each variable being computed from the received signal samples and said pilot symbols for each respective first and second wireless channel;
generating a first and second channel estimate corresponding to the first and second antennas from the first and second variables;
combining the first and second channel estimates to generate a combined channel estimate; wherein,
if $N_p=2$, generating the signal power estimate from the combined channel estimate, a noise power estimate by filtering the combined channel estimate, and the SIR using the signal power estimate and the filtered noise power estimate;
otherwise, generating the signal power from the combined channel estimate, the noise power from the first and second variables; and the SIR using signal power and the noise power.

2. The method according to claim 1, comprising:
generating an estimate of signal power using the combined channel estimate;
generating an estimate of noise power using the combined channel estimate; and
generating an estimate of SIR from the estimate of signal power and estimate of noise power.

3. The method according to claim 2, comprising the step of filtering the estimate of signal power and the estimate of noise power prior to generating the estimate of SIR.

4. The method according to claim 3, wherein the step of filtering the signal power and noise power estimates uses settable filtering parameters.

5. The method according to claim 1, wherein the step of calculating the first and second variables is performed depending on the length of the pilot symbols on the first and second channels.

6. The method according to claim 1, wherein the step of generating the first and second channel estimates from the first and second variables comprises summing the values in the sequence for each of the first and second variables respectively and dividing it by the number $N_p$ of pilot symbols in the pilot symbol structure.

7. A wireless receiver for use in a wireless communications system, the receiver comprising:
a first and second antenna for receiving a sequence of signal samples via first and second wireless channels;
a memory for storing pilot symbol which have been transmitted over the first and second wireless channels, each pilot symbol having a length $N_p$; where $N_p \geq 2$; and
a processor for generating an estimate of a signal power, a noise power and a signal to interference ratio (SIR) for the sequence of signal samples received via the first and second wireless channels, said processor programmed to implement the following steps:
calculating first and second variables corresponding to the first and second antennas, each variable being computed from the received sequence of signal samples and said pilot symbols for each respective first and second wireless channel;
generating a first and second channel estimate corresponding to the first and second antennas from the first and second variables;
combining the first and second channel estimates to generate a combined channel estimate; wherein,
if $N_p=2$, generating the signal power from the combined channel estimate, the noise power by filtering the combined channel estimate, and the SIR using the signal power and the filtered noise power;
otherwise, generating an estimate of the signal power from the combined channel estimate, the noise power from the first and second variables, and the (SIR) using the signal power and the noise.

8. The receiver according to claim 7, wherein the processor is programmed to carry out the steps of:
generating an estimate of signal power using the combined channel estimate;
generating an estimate of noise power using the combined channel estimate; and
generating an estimate of SIR from the estimate of signal power and estimate of noise power.

9. The wireless receiver according to claim 8, comprising a filter for filtering the combined channel estimate prior to the step of generating an estimate of noise power from the combined channel estimate.

10. A wireless communications system comprising:
a transmitter arranged to transmit via first and second antennas first and second wireless signals, the first wireless signal comprising a first pilot symbol structure and the second wireless signal comprising a second pilot symbol structure; and the wireless receiver according to claim 7.

* * * * *